(12) United States Patent
Krueger et al.

(10) Patent No.: US 6,629,187 B1
(45) Date of Patent: Sep. 30, 2003

(54) CACHE MEMORY CONTROLLED BY SYSTEM ADDRESS PROPERTIES

(75) Inventors: Steven D. Krueger, Dallas, TX (US); David A. Comisky, St. Charles, IL (US)

(73) Assignee: Texas Instruments Incorporated, Dallas, TX (US)

( * ) Notice: Subject to any disclaimer, the term of this patent is extended or adjusted under 35 U.S.C. 154(b) by 302 days.

(21) Appl. No.: 09/702,477

(22) Filed: Oct. 31, 2000

Related U.S. Application Data

(60) Provisional application No. 60/183,527, filed on Feb. 18, 2000, and provisional application No. 60/183,418, filed on Feb. 18, 2000.

(51) Int. Cl.⁷ ............................................. G06F 12/08
(52) U.S. Cl. .................. 711/3; 711/1; 711/118; 711/130; 711/144; 711/147; 711/209
(58) Field of Search ................. 711/3, 1, 118, 711/130, 144, 147, 209

(56) References Cited

U.S. PATENT DOCUMENTS

| | | | | |
|---|---|---|---|---|
| 5,072,418 A | * | 12/1991 | Boutaud et al. | 708/207 |
| 5,329,471 A | * | 7/1994 | Swoboda et al. | 703/23 |
| 5,524,225 A | * | 6/1996 | Kranich | 711/3 |
| 5,535,331 A | * | 7/1996 | Swoboda et al. | 714/45 |
| 5,586,293 A | * | 12/1996 | Baron et al. | 711/118 |
| 5,623,636 A | * | 4/1997 | Revilla et al. | 711/163 |
| 5,625,794 A | * | 4/1997 | Inoue et al. | 711/138 |
| 5,638,537 A | * | 6/1997 | Yamada et al. | 711/167 |
| 5,813,041 A | * | 9/1998 | McIntyre et al. | 711/167 |
| 5,815,648 A | * | 9/1998 | Giovannetti | 714/5 |
| 5,940,858 A | * | 8/1999 | Green | 711/139 |
| 6,167,466 A | * | 12/2000 | Nguyen et al. | 710/30 |
| 6,182,203 B1 | * | 1/2001 | Simar et al. | 712/22 |
| 6,535,958 B1 | * | 3/2003 | Fuoco et al. | 711/122 |

FOREIGN PATENT DOCUMENTS

| | | | | |
|---|---|---|---|---|
| EP | 0 398 189 A | | 11/1990 | G06F/12/08 |
| EP | 0 598 570 A | | 5/1994 | G06F/12/08 |
| EP | 1126378 A1 | * | 8/2001 | G06F/12/08 |

OTHER PUBLICATIONS

Yang et al., "An Adaptive Cache Coherence Scheme for Hierarchical Shared-memory Multiprocessors," pp 318-325, IEEE, 1990.*

* cited by examiner

*Primary Examiner*—Matthew Kim
*Assistant Examiner*—Stephen Elmore
(74) *Attorney, Agent, or Firm*—Gerald E. Laws; W. James Brady, III; Frederick J. Telecky, Jr.

(57) ABSTRACT

A digital system is provided with a microprocessor (100), a cache (120) and various memory and devices (140a–140n). Signals to control certain cache memory modes are provided by a physical address attribute memory (PAAM) (130). For devices present in the address space of the digital system that have different capabilities and characteristics, misuse is prevented by signaling an error or otherwise limiting the use of each device in response to attribute bits in the PAAM associated with the memory mapped address of the device. A memory management unit (110) with address translation capabilities and/or memory protection features may also be present, but is not required for operation of the PAAM.

15 Claims, 4 Drawing Sheets

CACHE MEMORY CONTROLLED BY SYSTEM ADDRESS PROPERTIES

This application claims priority under 35 USC §119(e)(1) of Provisional Application No. 60/183,527, filed Feb. 18, 2000 (TI-30302PS) and of Provisional Application No. 60/183,418, filed Feb. 18, 2000 (TI-29846PS).

FIELD OF THE INVENTION

This invention generally relates to microprocessors, and more specifically to improvements in cache memory access circuits, systems, and methods of making.

BACKGROUND OF THE INVENTION

Microprocessors are general purpose processors which provide high instruction throughputs in order to execute software running thereon, and can have a wide range of processing requirements depending on the particular software applications involved. Many different types of processors are known, of which microprocessors are but one example. For example, Digital Signal Processors (DSPs) are widely used, in particular for specific applications, such as mobile telecommunication processing applications. DSPs are typically configured to optimize the performance of the applications concerned and to achieve this they employ more specialized execution units and instruction sets.

Cache memory is provided in order to reduce memory access time for instructions and/or data and thereby provided higher instruction throughput. In a computer system that uses cache memory, certain cache memory modes need to be controlled. Often the signals to control the cache memory in a general microprocessor system come from a memory management unit. However, in embedded system such as those that employ digital signal processors, there is often no memory management unit.

In addition, various memory mapped peripheral devices that may be included in a particular embedded system may not all have the same access capabilities.

SUMMARY OF THE INVENTION

In general, and in a form of the present invention, a digital system is provided with a microprocessor, a cache and various memory and devices. Signals to control certain cache memory modes are provided by a physical address attribute memory (PAAM). For devices present in the address space of the digital system that have different capabilities and characteristics, misuse is prevented by signaling an error or otherwise limiting the use of each device in response to attribute bits in the PAAM associated with the memory mapped address of the device. A memory management unit with address translation capabilities and/or memory protection features may also be present, but is not required for operation of the PAAM.

BRIEF DESCRIPTION OF THE DRAWINGS

Particular embodiments in accordance with the invention will now be described, by way of example only, and with reference to the accompanying drawings in which like reference signs are used to denote like parts, unless otherwise stated, and in which.

Corresponding numerals and symbols in the different figures and tables refer to corresponding parts unless otherwise. indicated.

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
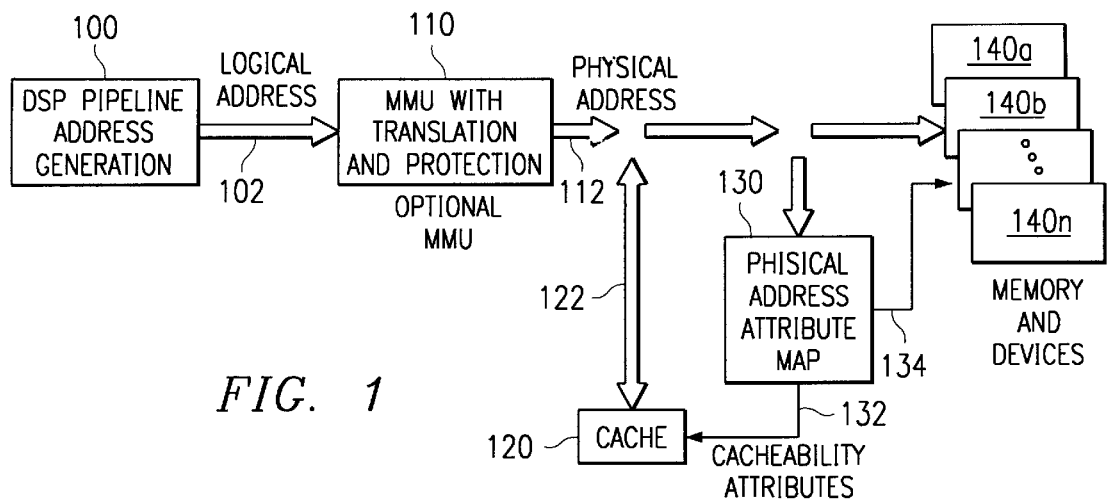
FIG. 1 is a block diagram of a digital system that has a single cache and that includes an embodiment of the present invention.

FIG. 1 is a block diagram of a digital system that includes an embodiment of the present invention. In the interest of clarity, FIG. 1 only shows those portions of microprocessor 100 that are relevant to an understanding of an embodiment of the present invention. Details of general. construction for DSPs are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of microprocessor 100 relevant to an embodiment of the present invention are explained in sufficient detail herein below, so as to enable one of ordinary skill in the microprocessor art to make and use the invention.

Referring still to FIG. 1, DSP 100 includes circuitry for an instruction execution pipeline. Included within the execution pipeline is address generation circuitry that forms addresses on address bus 102 for accessing data and instructions from memory and device circuitry 140a–140n. Memory mapped registers and interfaces to various physical devices such as timers, serial ports, parallel ports, etc are also included within memory and device circuitry 140a–140n. A memory management unit (MMU) 110 is connected to the DSP address generator via address bus 102. MMU 110 translates logical addresses on address bus 102 to physical addresses that are provided to physical address bus 112. Logical addressing provides a stable frame of reference for instructions and data that is not directly tied to the actual physical memory connected to DSP 100. One skilled in the art is aware of the operation of MMU units in general for address translation, so the operation of MMU 110 will not be described further herein. For purposes of the present invention, the presence of MMU 110 is optional. In fact, currently a majority of DSP systems do not include a memory management unit such as MMU 110. In the absence of MMU 110, the address generation circuitry of DSP 100 generates physical addresses instead of logical addresses and physical address bus 112 is connected directly to address bus 102 of DSP 100.

Still referring to FIG. 1, cache memory 120 is connected to physical address bus 112 and provides requested instructions and/or data to DSP 100 faster than memory circuits 140a–140n. Bus 122 represent both the address bus connected to the cache as well as a data bus that provides accessed instructions and/or data to a central processing unit (CPU) of DSP 100. One skilled in the art is familiar with cache circuits, so the operation of cache circuit 120 will not be described in detail herein. Physical Address Attribute Map (PAAM) 130 is also connected to physical address bus 112 and is used to describe to cache 120 and DSP 100 the capabilities of underlying hardware in the on-chip or off-chip system at any given physical address. If the underlying hardware is random access memory (RAM) with memory semantics, the cache can take a number of liberties with access to the location. If the underlying hardware is the receive FIFO buffer of a serial port, for example, the semantics are very different than RAM and the cache must take care not to mask the volatile behavior of the FIFO.

PAAM 130 is normally consulted only on cache misses. The properties for an address that triggers a cache miss that are produced by PAAM 130 are coupled to cache 120 via cacheability attribute signals 132. Cache 120 responds to the cacheability attribute signals to select a sensible cache behavior for the kind of device implemented at the physical address that triggered the cache miss. Attribute signals 134 are also provided to the various memory circuits 140a–140n to convey information to the bus interface to better utilize the addressed device.

Several assumptions can be made about embedded systems that typify DSP systems, such as the system of FIG. 1. For example, as discussed above, an MMU may be present but often is not needed and is not present. Physical address space is populated with RAM, read only memory (ROM) and various devices such as input/output (I/O), timers, etc. Program access to ROM and the various devices is not rare. Caches in embedded systems must behave reasonably based on whether the physical address backing up the location is RAM, ROM or a device, with or without the presence of an MMU. Once an embedded system is designed and fabricated, composition and address assignments of RAM, ROM and devices rarely, if ever, change, unless the address mapping is programmable. It is generally important to be aware of empty address space so that an erroneous access to an empty memory space address does not result in a system delay but is instead promptly reported as an error to be handled appropriately. Errors are signaled in several ways: by bus transaction completion status or by interrupt, for example. Once signaled, the processor responds by setting an error status, by vectoring to an interrupt or by entering an exception handler, depending on circumstances.

Many different operating systems (OS) are employed by various embedded systems, including: commercial, homegrown, and bare hardware. Advantageously, use of a physical address attribute map can improve operational reliability of a digital system equipped with either of these operating systems.

Figure 2A:
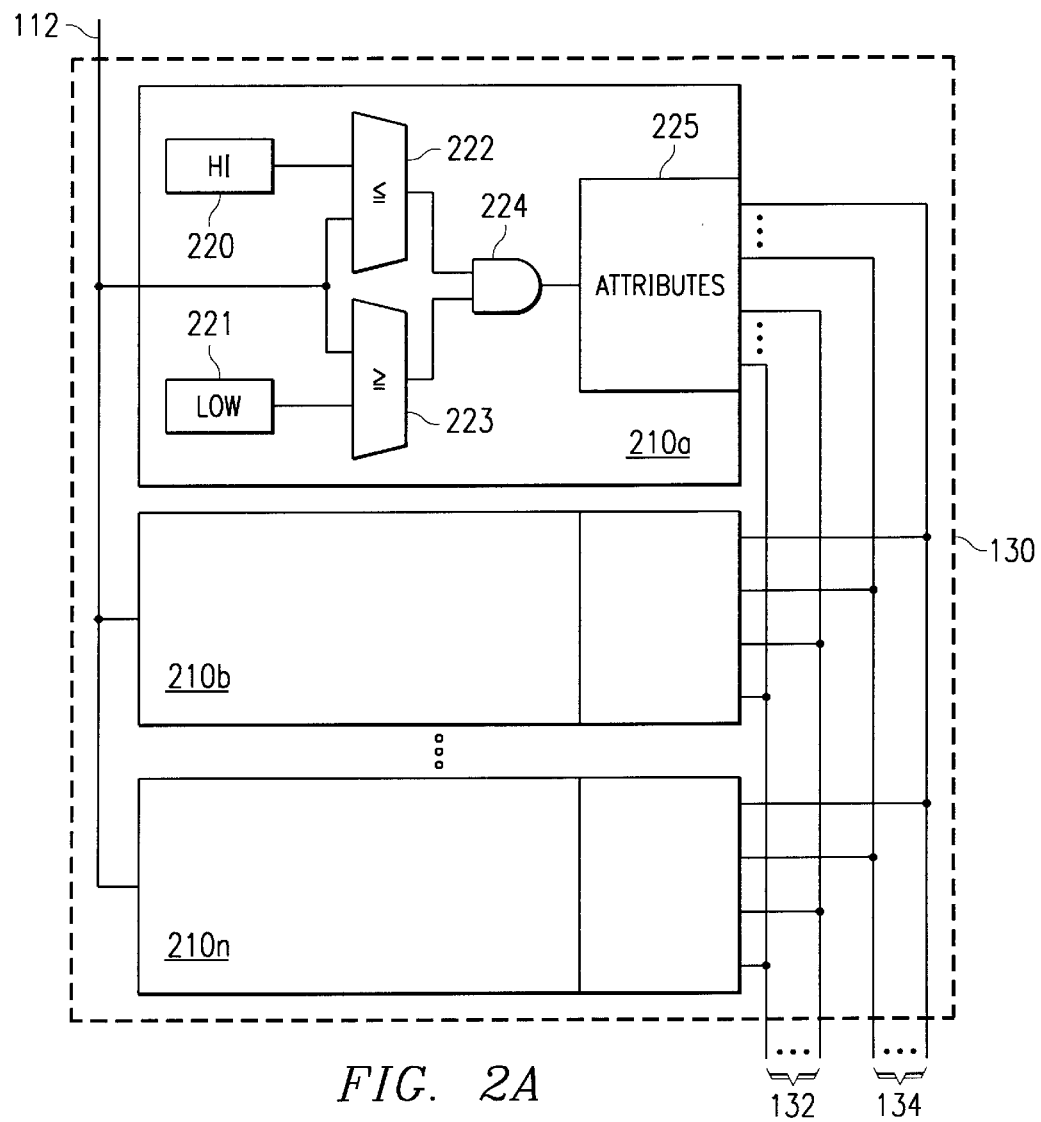
FIG. 2A is a block diagram of a physical address attribute map of the system of FIG. 1 implemented with associative mapping.

FIG. 2A is a block diagram of a physical address attribute map 130 of the system of FIG. 1 implemented with associative mapping. Associative mapping relies on address range comparisons to find attribute associations. The physical address is compared to several address ranges and the matching one provides the attributes for the address. Comparison block 210 is representative of any number of comparison blocks 210a–210n that can be instantiated in PAAM 130. Within comparison block 210a is high limit register 220 and a low limit register 221. Comparator 222 compares the contents of high limit register 220 and a proffered physical address from address bus 112 and asserts an output signal if the physical address is less than or equal to the high limit. Likewise, comparator 223 asserts an output signal if the physical address is greater than or equal to the contents of low limit register 221. AND gate 224 is connected to receive the two signals from the two comparators and to enable attribute register 225 to drive cacheability attribute signals 132 and attribute signals 134 only when the proffered physical address has a value between the low limit and the high limit. Each high limit and low limit register and each associated attribute register is arranged so that it can be read and written by DSP 100 as memory mapped registers. In an alternative embodiment, some or all of these registers can be configured as ROM or electrically alterable programmable ROM (EAPROM), for example.

Thus, a set of regions within an address space associated with the memory subsystem is identified. For each access to the memory subsystem, the PAAM detects which of the set of regions is being accessed by monitoring an address of each memory request to the memory subsystem and provides attribute signals associated with that region. In response to the attribute signals provided by the PAAM, the cache is operated in a first mode in response to detecting an access in a first memory region and the cache is operated in a second mode in response to detecting an access in a second memory region. Likewise, in response to the attribute signals provided by the PAAM, the memory subsystem is operated in a first mode in response to detecting an access in a particular memory region and the memory subsystem is operated in a second mode in response to detecting an access in a different memory region. If a particular region is accessed, such as an empty region, the PAAM asserts a control signal when this region is detected and DSP 100 is notified and takes appropriate action.

Associative mapping has several features that commend it, as follows: complexity scales easily by scaling the number of comparison registers; it can be arranged to easily support differing physical address sizes; and it supports highly variable address regions including regions that are quire small or large. Associative mapping also has several disadvantages, as follows: anomalous operation may occur if one or more limit register are set incorrectly, such that more than one address range matches the proffered physical address; a megamodule that embodies a PAAM may not have a sufficient number of address range comparison blocks for a particular instantiation of a system; each comparison block is relatively expensive in terms of transistor count and resulting integrated circuit (IC) die size, such that a fully configured associative address mapped PAAM may be prohibitive for embedded system applications.

Figure 2B:
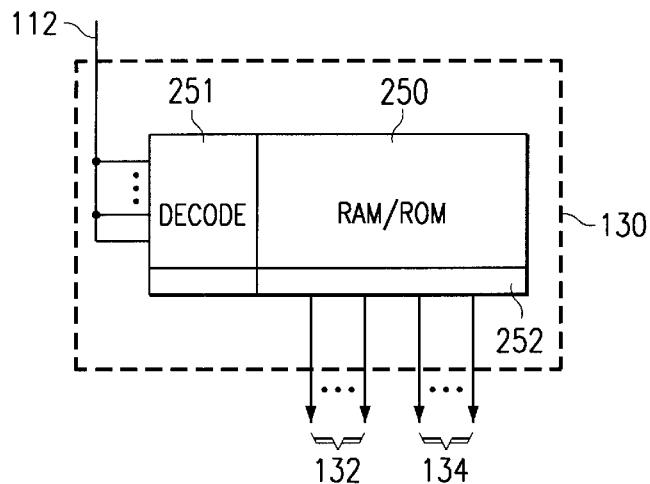
FIG. 2B is a block diagram of an alternative embodiment of a physical address attribute map of the system of FIG. 1 implemented with direct mapping.

FIG. 2B is a block diagram of an alternative embodiment of physical address attribute map 130 of the system of FIG. 1 implemented with direct mapping. Direct mapping uses a portion of the physical address as an index into a table of attributes. If the table is large enough to map all physical addresses, there is no need for associative type comparisons. In FIG. 2B, table 250 comprises a number of entries that are selectable by decoding a portion of physical address bus 112 via decoder 251. In the present embodiment, address bus 112 is a 32-bit bus. Each entry in table 250 is a four byte entry and represents a fixed size of 16 MB of the entire 4 gigabyte physical address space. Each entry represents an address range of twenty-four bits, therefore only eight most significant address bits need be decoded by decode circuitry 251. For full coverage of the eight address bits, 256 entries are required. Each entry is arranged so that it can be read as a memory mapped item. Thus the total PAAM table 250 occupies 1024 bytes of the address space. The base address of the PAAM table megacell can be instantiated at various locations in various embedded systems and is aligned on its size (1024 bytes). Each entry is further sub-divided into sixteen sub-regions that each represent 1 MB of physical address space. Routing circuitry 252 allows information stored in each table entry to be routed to either cacheability attribute signals 132 or attribute signals 134 or to both. In an alternative embodiment, attribute signals are not separated.

Direct mapping is advantageous in that it can be inexpensive in terms of transistor count and IC area. It does not suffer from multiple matches, and if fully populated it always covers the entire physical memory address space. However, direct memory has some disadvantages, in that the complexity of a direct mapped scheme is in fixed overhead that is not easily scalable. It does not readily support small region sizes without an excessive number of table entries.

On many implementations of embedded systems, much of the contents of the PAAM table will be constant because it corresponds to addresses that are for on-chip resources, or addresses that cannot have any device due to bus limitations. In many cases, only physical addresses that can address devices on an external bus need to have programmable registers. Thus, a portion of table 250 is implemented as ROM and a portion is implemented as RAM. Alternatively, a portion may be implemented as EAPROM, for example.

Figure 3:
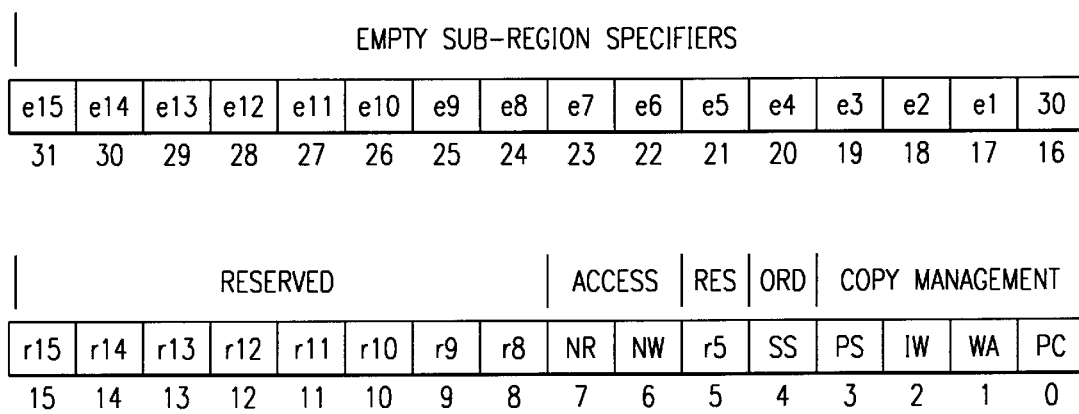
FIG. 3 illustrates a set of physical address attributes for each entry of the physical address attribute maps of FIGS. 2A and 2B.

FIG. 3 illustrates a set of physical address attributes for each entry of the physical address attribute map of FIG. 2A and 2B. The attributes of a region of the physical address space are specified by a PAAM entry of 32 bits. The bits are divided into several groups: copy management, order specifiers, access specifiers, and sub-region empty flags, as described below.

Four attribute specifier bits are included in the Copy Management group and are defined to control the behavior of caching mechanisms that can make copies of data from the region, as shown in Table 1. These specify what a cache implementation may or must do under certain circumstances when accessing data from this region.

TABLE 1

Copy Management Attribute Bits

| | |
|---|---|
| PC Permit Copies | If PC is 0, copies of data from addresses in this region are not permitted. Usually, PC is zero for device registers that could return different values on successive reads. If PC is 1, copies are permitted. If PC is 0, reads from this address region that miss in any cache must not be allocated in the cache. Thus, caching is effectively disabled for this address region. If PC is 1, then reads from this address that miss in a cache may be allocated in the cache. A PC of 1 does not require the caching. Note that cache hits need never consult this bit. When changing PC from 1 to 0, there is no automatic action that ensures that no cache contains a copy that was previously permitted. Under most circumstances, the software that sets PC to 0 will need to flush at least those cache entries that correspond to addresses in the affected region. |
| WA Write Allocate | The device(s) in this region of the address space has timing which benefits from write allocation. If WA is 1 and PC is 1, a write that misses the cache may be allocated in the cache. If WA is 0, a write may hit in the cache if the data is already present in the cache, but if the cache misses, the next access to that address must still miss the cache because the address must not be allocated in the cache. |
| IW Immediate Write | If IW is 1, every store to an address in this region must be sent to the device immediately. If the address hits in a data cache or store buffer, the store also updates the cache contents. If IW is 0, stores that hit in a data cache are not sent |

TABLE 1-continued

Copy Management Attribute Bits

| | |
|---|---|
| | to the device until the cache line is evicted, usually after absorbing more than one store. (Immediate Write behavior can also be called Write Through behavior. An immediate write is performed in order at the device and each write appears distinctly at the device. This definition does not allow write merging, but does allow some buffering. Reads to other addresses may complete before the immediate write, but read operations to the same address cannot occur before the write completes. (c.f., SS) Proper operation of caches will require that IW be copied to cache tags for blocks that are allocated in caches (because they have PC set). |
| PS Possible Sharing | If PS is 1, cached copies if any of data in this region may be shared. If PS is 0, cached copies may assume no sharing occurs. PS is provided because implementations often have a performance cost to coherence operations on data that might be shared. Data areas that are never shared may be accessed without this performance cost on some implementations. In particular, other processors or DMA activity on regions with PS of 0 will not use modified copies in cache memories or update the cache memories with new values. Choosing PS of 0 for regions with PC of 1 and NW of 0 should be carefully checked to be sure that the software would use the memory without any reliance on coherence. |

There is an order specifier bit, referred to as Synchronous Store (SS) in FIG. 3. It is utilized in system embodiments that support out-of-order memory operations. The SS bit forces stores to this area to be in a strictly specified order. A store to an address with SS of one is a synchronous store. The DSP pipeline must not perform other load or store operations until this store is complete at the device. SS of 1 is only meaningful when IW is 1 or PC is 0. If PC is 1 and IW is 0, the operation of the chip is undefined and may vary from implementation to implementation. If SS is 1, PC is 1, IW is 1 and WA is 1, the situation might arise when a write to the region causes a write allocation. In this case, the operation is defined to perform the cache eviction if needed and the cache line read before performing a synchronous write to the device and to the cache(s).

The access specifier group indicate whether the device supports read operations and/or write operations, as defined in Table 2.

TABLE 2

Access Specifier Attribute Bits

| | |
|---|---|
| NW No Write | If NW is 1, this address does not support write operations. Any attempt to write to an address marked with NW = 1 is an error. If the address is on an external bus, the bus should not show a transaction for this address, but instead an error should be reported. Early devices may omit detecting and reporting this error. When NW is 0, writes are permitted. |
| NR No Read | If NR is 1, any read access to this device is in error. If the address is on an external bus, the bus should not show a transaction for this address, but instead an error should be reported. Early implementations may omit detecting and reporting this error. When NR is 0, reads are permitted. Note: NR governs both data reads (LDx) and program fetches. A program fetch from a device at an address with NR = 1 is a Device Capability Error, just as is a LD instruction that addresses such a device. |

Sub-Region Empty Flags e15–e0 indicate sub-regions that are empty. Each region is divided into sixteenths, and each is controlled by one of these flags. If a sub-region flag is 0, the region specifiers NR, NW, SS, PS, IW, WA, and PC control the sub-region. If a sub-region flag is 1, the sub-region has the implied specifiers PAAM_EMPTY (NR and NW are 1, all others are 0).

Reserved Bits r5 and r8–r15 are reserved and must read as zero in the present embodiment. Writes to these bits must be ignored. Other embodiments may define these bits for various functions.

Table 3 illustrates a set of definitions that can be used within. an initialization program of an embedded system to program the programmable entries in the PAAM. By using defines 9–16, a program can be written to get appropriate behavior for most common. devices in a system. For example, define 9 is stored into each PAAM table entry that corresponds to an address region that is not implemented. Define 14 is stored into each PAAM table entry that corresponds to a memory region that is implemented as a ROM. Other entries in the PAAM are loaded appropriately, in accordance with the characteristic of the associated address region.

A PAAM should be in a region coded as PAM_DEV, define 15. Because that sets SS, a change to a PAAM entry will be immediately recognized on the next DSP load or store operation. When modifying a PAAM, it is sometimes necessary to flush associated caches. A cache should be flushed of addresses in a region covered by a modified region entry when the following occur, for example: clearing PAAM_PC, setting PAAM_IW when PAAM_PC is set in the entry, setting PAAM_NW or PAAM_NR when PAAM_PC is set in the entry, or when setting PAAM_PS when PAAM_PC is set in the entry.

TABLE 3

Example Definitions for Attribute Entries

| 1  | #DEF PAAM_PC       | 1                     |
|----|--------------------|-----------------------|
| 2  | #DEF PAAM_WA       | 2                     |
| 3  | #DEF PAAM_IW       | 4                     |
| 4  | #DEF PAAM_PS       | 8                     |
| 5  | #DEF PAAM_SS       | 0x10                  |
| 6  | #DEF PAAM_R5       | 0x20                  |
| 7  | #DEF PAAM_NW       | 0x40                  |
| 8  | #DEF PAAM_NR       | 0x80                  |
| 9  | #DEF PAAM_EMPTY    | PAAM_NR+PAAM_NW       |
| 10 | #DEF PAAM_RW_MEM   | PAAM_PC+PAAM_PS       |
| 11 | #DEF PAAM_SRAM     | PAAM_RW_MEM+PAAM_WA   |
| 12 | #DEF PAAM_DRAM     | PAAM_RW_MEM+PAAM_WA   |
| 13 | #DEF PAAM_MEM_SLOW | PAAM_RW_MEM           |
| 14 | #DEF PAAM_ROM      | PAAM_PC+PAAM_NW       |
| 15 | #DEF PAAM_DEV      | PAAM_SS               |
| 16 | #DEF PAAM_FR_BUF   | PAAM_PC+PAAM_IW       |

The IW and WA specifiers interact. The behavior of a fully functional cache system to these two is shown in Table 4. Note that various system implementations may ignore WA under some or all circumstances.

TABLE 4

IW and WA interactions

| WA =       | 0             | 0               | 1                 | 1               |
|------------|---------------|-----------------|-------------------|-----------------|
| IW =       | 0             | 1               | 1                 | 0               |
| Write Hit  | Write to cache | Write to device and to cache | Write to device and to cache | Write to cache. |
| Write Miss | Write to device | Write to device. | Allocate write to cache and to device | Allocate. Write to cache. |

When a 16-MB region of memory contains devices of several types, the PAAM entry must be set to capabilities compatible with all devices in the region. Usually, this means that PC is only set if all devices in the region can be cached. NR and NW are only set if they apply to all devices in the region. IW must be set if any device in the region needs it.

In alternative embodiments of the invention, there is a great latitude in choosing how much of the specified PAAM to implement. The choices involve balancing the features and flexibility of programmable PAAM registers versus the cost of implementing the full mechanism. A system implementations may reduce the amount of chip area used by the PAAM in two ways: (1) constant entries, (2) implementing only certain bits per register.

(1) Many portions of many physical address space maps will not need programmable PAAM registers and can be implemented with constant entries. Large parts of the physical address space might not have any devices. In addition, physical address space that maps to on-chip devices might not need programmable registers, or might require only certain bits to be programmable, for example, an on-chip RAM might require only the PS bit. Generally, full programmability (to the extent implemented) should be afforded to external buses that can be configured to contain devices not known when an IC or a megamodule that includes a PAAM is designed.

(2) An implementation may implement only some of the specifier bits. A chip must implement PC if it has caches. It may also implement the other copy management bits. If memory sharing is supported, PS may be implemented. Cache snooping may be implemented to support sharing. A chip may implement WA and IW if its cache can make use of these values. A chip must implement NR and NW if it supports error detection, but may omit them if not. A chip that can provide sufficient synchronization of I/O device writes without implementing SS may omit it. If the chip implements out-of-order memory operations that prevent the reliable operation of devices with multiple control registers, it must implement SS. In portions of the map that have programmable registers, a write must set or clear bits that are implemented. Unimplemented bits must always read back as 0. Implementations that have cache systems that always perform write allocation or write back, may have the PAAM return constant 1 for those bit positions. However, the PAAM is not expected to return different values based on cache configuration or contents. Implementation may choose not to implement the sub-region empty flags. In this case, all sixteen will read as 0 and be ignored on write. These implementations will use the specifiers in a given entry for all sub-regions associated with that entry.

In an alternative embodiment, a portion of the address can be covered by a direct mapped table, and another portion of the address space can be covered by one or more associatively mapped comparison blocks.

In an alternative embodiment each comparison block of various associatively mapped embodiments may compare all bits of the physical address, or a limited number of most significant bits of the physical address, resulting in courser grain address ranges.

In an alternative embodiment, implementations that implement PS might need programmable registers for on-chip memory that can be shared and in some embodiments, the PS bit from PAAM might be used in combination with information from the processor such as opcode used and/or information from the MMU to determine the sharing status of the data in cache."

Figure 4:
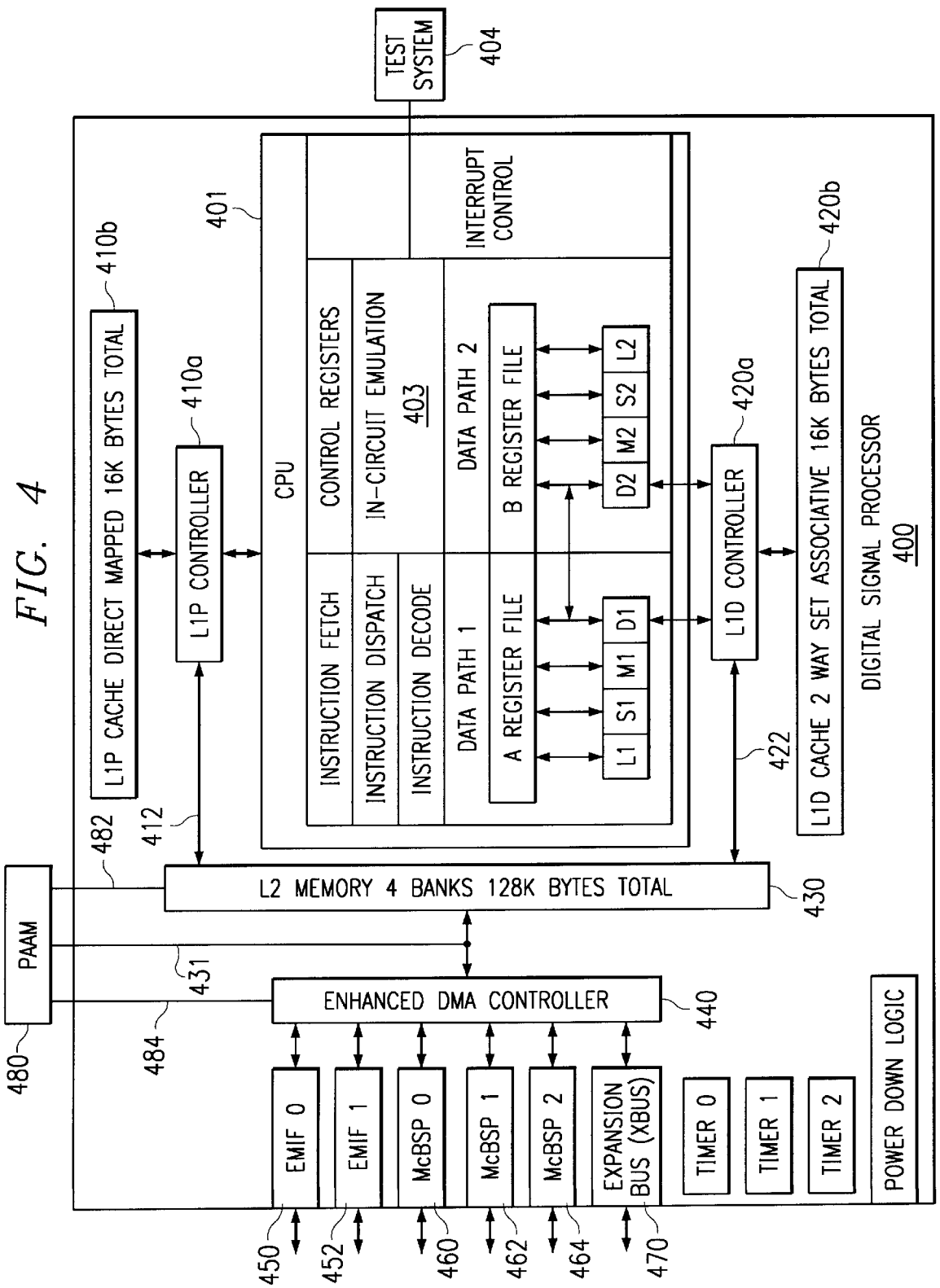
FIG. 4 is a block diagram of a digital system that has dual first level caches and a single second level cache and that includes an embodiment of the present invention.

FIG. 4 is a block diagram of a digital system 400 that has dual first level caches 410, 420 and a single second level cache 430 and that includes an embodiment of the present invention. Central Processing Unit (CPU) 401 which will be described in more detail below. A direct mapped program cache 410, having 16 kbytes capacity in cache memory 410a and L1 Program (L1P) controller 410b, is connected to the instruction fetch stage of CPU 401. A 2-way set associative data cache 420, having a 16 kbyte capacity in cache memory 420a and Level 1 Data (L1D) controller 420b is connected to data units D1 and D2 of CPU 401. Level 2 (L2) cache memory 430 having four banks of memory, 128 Kbytes total, is connected to L1P 410 and to L1D 420 via buses 412 and 422 respectively to provide storage for data and programs. Level one instruction cache (L1P) 410 stores instructions used by central processing unit core 401. Central processing unit core 401 first attempts to access any instruction from level one instruction cache 410. Level one data cache (L1D) 420 stores data used by central processing unit core 401. Central processing unit core 401 first attempts to access any required data from level one data cache 420. The two level one caches are backed by level two unified cache (L2) 430. In the event of a cache miss to level one instruction cache 410 or to level one data cache 420, the requested instruction or data is sought from level two unified cache 430. If the requested instruction or data is stored in level two unified cache 430, then it is supplied to the requesting level one cache for supply to central processing unit core 401. As is known in the art, the requested instruction or data may be simultaneously supplied to both the requesting cache and central processing unit core 401 to speed use.

External memory interface (EMIF) 450 provides a 64 bit data path to external memory, not shown, which provides memory data to L2 cache memory 430 via extended direct memory access (DMA) controller 440. Extended DMA controller 440 is connected via physical address/data bus 431 to receive all read and write requests from L2 cache 430. Details of the operation of extended DMA controller is not important to the present invention; details are provided in U.S. patent application Ser. No. 09/637,491 (TI-26021) entitled *Data Bus Using Synchronous Latency Loop Including Read Address And Data Busses And Write Address And Data Buses*, and in U.S. patent application Ser. No. 09/637,492 (TI-28979) entitled *Hub Interface Unit And Application Unit Interfaces For Expanded Direct Memory Access Processor*, both of which are incorporated herein by reference.

EMIF 452 provides a 16 bit interface for access to external peripherals, not shown. Expansion bus 470 provides host and I/O support.

Three multi-channel buffered serial ports (McBSP) 460, 462, 464 are connected to DMA controller 440. A detailed description of a McBSP is provided in U.S. Pat. No. 6,167,466 (TI-26204, Seshan, et al) and is incorporated herein reference. Emulation circuitry 50 provides access to the internal operation of integrated circuit 1 which can be controlled by an external test/development system (XDS) 51.

CPU 401 further has an instruction fetch, instruction dispatch and instruction decode pipeline, and duplicate data path 1 and data path 2. Data path 1 has a plurality of execution units, including an arithmetic and load/store unit D1, a multiplier M1, an ALU/shifter unit S1, an arithmetic logic unit ("ALU") L1, a shared multi-port register file A from which data are read and to which data are written. Decoded instructions are provided from the instruction fetch/decode pipeline to the functional units D1, M1, S1, and L1 over various sets of control lines which are not shown. Data are provided to/from the register file from/to load/store units D1 over a first set of busses, to multiplier M1 over a second set of busses, to ALU/shifter unit S1 over a third set of busses, and to ALU L1 over a fourth set of busses. Data are provided to/from the cache memory 420 from/to the load/store units D1 via a fifth set of busses. Note that the entire data path described above is duplicated in data path 2 with register file B and execution units D2, M2, S2, and L2. Instructions are fetched by the instruction fetch unit from instruction cache memory 410 over a set of busses. The size and configuration of the various caches are not of significance to the present invention. These are matters of design choice. Also, the particular selection and number of execution units are a matter of design choice, and are not critical to the invention. A description of various architectural features of the microprocessor 400 of FIG. 4 is provided in co-assigned application Ser. No. 09/703,096 (TI-30302) entitled *Microprocessor with Improved Instruction Set Architecture*, and is incorporated herein by reference. A description of a basic set of instructions for microprocessor 400 is also provided in co-assigned application U.S. Pat. No. 6,182,203 (TI-25311) entitled *Improved Microprocessor*, and is incorporated herein by reference.

External test system 404 is representative of a variety of known test systems for debugging and emulating integrated circuits. One such system is described in U.S. Pat. No. 5,535,331 entitled *Processor Condition Sensing Circuits, System, and Methods* and is incorporated herein by reference. Test circuitry 403 contains control registers and parallel signature analysis circuitry for testing integrated circuit 400.

According to an aspect of the present invention, PAAM 480 is connected to physical address bus 431. Cacheability attribute signals 482 are connected to provide cacheability information to L2 cache 430. Attribute signals 484 signals are connected to provide attribute information for physical memory and devices connected to extended DMA controller 440.

Figure 5:
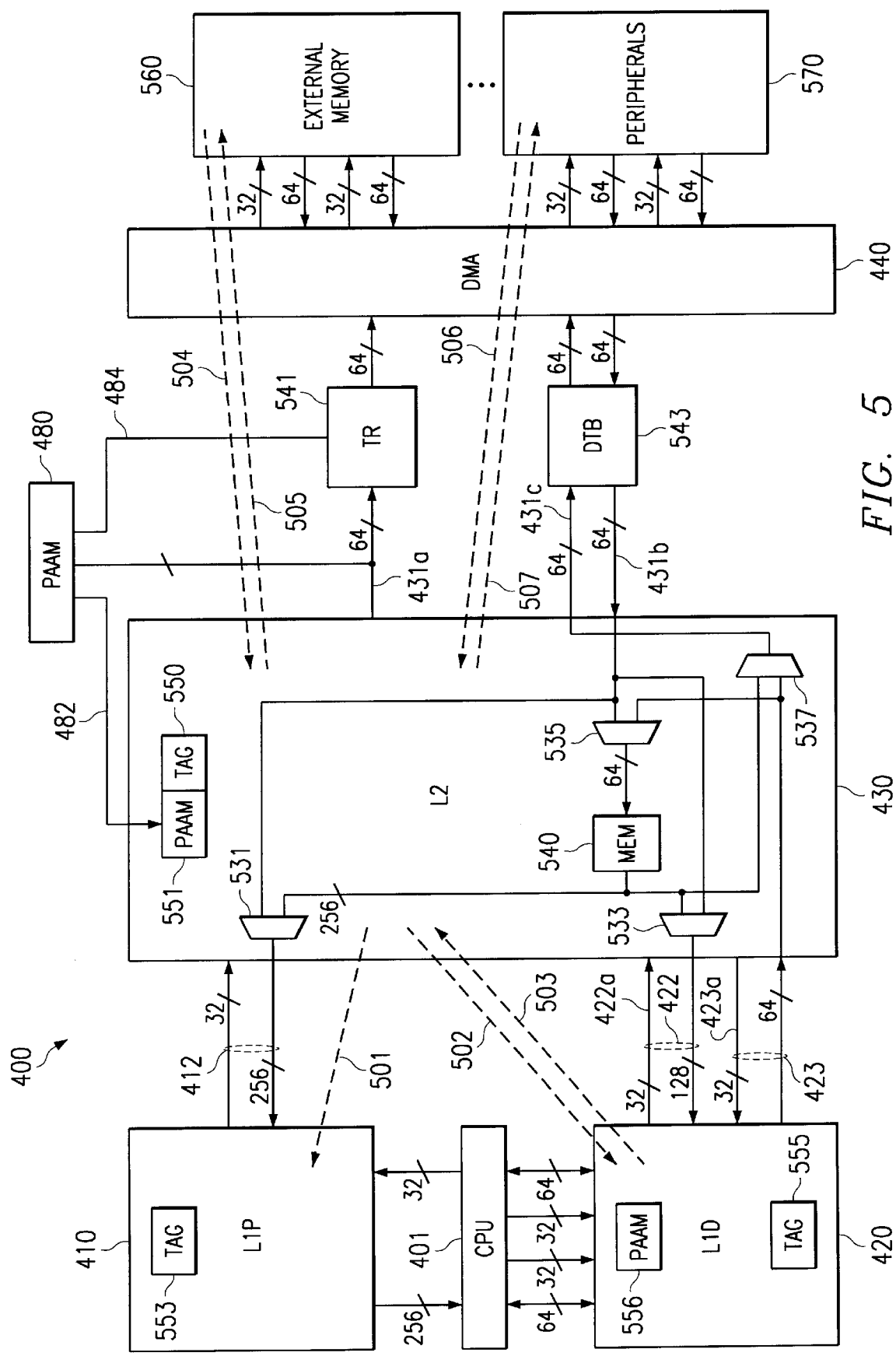
FIG. 5 is a block diagram of the digital system of FIG. 4 illustrating various data transfers among the various caches, memories and devices.

FIG. 5 is a block diagram of the digital. system of FIG. 4 illustrating various data transfers among the various caches, memories and devices in order to better explain the operation of PAAM 480. Digital signal processor system 400 includes a number of cache memories, as discussed with reference to FIG. 4. The complex interrelation of parts of digital signal processor system 400 permits numerous data movements. These are illustrated schematically in FIG. 5 and will now be described. First, level one program cache 410 may receive instructions recalled from level two unified cache 430 for a cache miss fill 501. In this embodiment, there is no hardware support for self-modifying code so that instructions stored in level one instruction cache 410 are not altered. There are two possible data movements between level one data cache 420 and level two unified cache 430. The first of these data movements is a cache miss fill 502 from level two unified cache 430 to level one data cache 420. Data may also pass from level one data cache 420 to level two unified cache 430, indicated at 503. This data movement takes place upon: a write miss to level one data cache 420 which must be serviced by level two unified cache 430; a victim eviction from level one data cache 420 to level two unified cache 430; and a snoop response from level one data cache 420 to level two unified cache 430. Data can be moved between level two unified cache 430 and external memory 160, indicated at 504 and 505. This can take place upon: a cache miss to level two unified cache 430 service from external memory or a direct memory access 440 data movement from external memory 560 and level two unified cache 430 configured as SRAM; a victim eviction from level two unified cache 430 to external memory 560 or a direct memory access 440 data movement from a portion of level two unified cache 430 configured as SRAM to external memory 560. Finally, data can move between level two unified cache 430 and peripherals 570, indicated at 506 and 507. These movements take place upon: an L2 read or write miss, or a direct memory access 440 data movement from peripheral 570 and level two unified cache 430 configured as SRAM; or a direct memory access 440 data movement from a portion of level two unified cache 430 configured as SRAM to peripherals 570. All data movement between level two unified cache 430 and external memory 560 and between level two unified cache 430 and peripherals 570 employ data transfer bus 543 and are controlled by direct memory access unit 440. These direct memory access data movements may take place as result of a command from central processing unit core 401 or a command from another digital signal processor system received via transfer request bus 541.

The number and variety of possible data movements within digital signal processor system 400 makes the problem of maintaining coherence difficult. In any cache system data coherence is a problem. The cache system must control data accesses so that each returns the most recent data. As an example, in a single level cache a read following a write to the same memory address maintained within the cache must return the newly written data. This coherence must be maintained regardless of the processes within the cache. This coherence preserves the transparency of the cache system. That is, the programmer need not be concerned about the data movements within the cache and can program without regard to the presence or absence of the cache system. This transparency feature is important if the data processor is to properly execute programs written for members of a data processor family having no cache or varying amounts of cache. The cache hardware must maintain the programmer illusion of a single memory space. An example of an ordering hazard is a read from a cache entry just victimized and being evicted from the cache. Another example in a non-write allocate cache is a read from a cache entry following a write miss to that address with the newly written data in a write buffer waiting write to main memory. The cache system must include hardware to detect and handle such special cases.

A cache system including a second level cache, such as that described above in conjunction with FIG. 5, introduces additional hazards. Coherence must be maintained between the levels of cache no matter where the most recently written data is located. Generally level one caches accessing data will have the most recent data while the level two cache may have old data. If an access is made to the level two cache the cache system must determine if a more recent copy of the data is stored in a level one cache. This generally triggers a snoop cycle in which the level two cache polls the level one cache for more recent data before responding to the access. A snoop is nearly like a normal access to the snooped cache except that snoops are generally given higher priority. Snoops are granted higher priority because another level cache is stalled waiting on the response to the snoop. If the data stored in the lower level cache has been modified since the last write to the higher level cache, then this data is supplied to the higher level cache. This is referred to as a snoop hit. If the data stored in the lower level cache is clean and thus not been changed since the last write to the higher level cache, then this is noted in the snoop response but no data moves. In this case the higher level cache stores a valid copy of the data and can supply this data.

A two level cache increases the special cases where there are hazards. Additional hazards with a two level cache include snoops to a lower level cache where the corresponding data is a victim being evicted, snoops to data in during a write miss in the lower level cache for non-write allocation systems which places the data in a write buffer. Other hazards are also possible. Details of coherence management do not affect the present invention, and are described fully in co-assigned U.S. Pat. No. 6,535,958 (TI-29344) entitled *Multilevel Cache System Coherence With Memory Selectively Configured As Cache Or Direct Access Memory And Direct Memory Access* and is incorporated herein by reference.

PAAM 480 operates similarly to PAAM 130, however, the proper operation of multi-level caches depends on supporting the region specifiers carefully in the caching system. For example, PC must always be honored. None of caches 410, 420 or 430 can contain a copy from an address whose region. is marked with PC as 0. Similarly, all caches must honor IW. In order for the level one cache to be aware of the attribute entries, a copy of attribute bits needed by the level one cache controllers 410*a*/420*a* is provided via bus 412/422 whenever a miss occurs at the level one cache.

For several of the bits it is beneficial to keep a copy of the bits with the cache tags so that they can be examined on every cache hit. Remote PAAM 551 in level two cache 430 is connected to receive and store cache attribute signals 482 in response to each entry that is stored in cache data storage memory 540. The PAAM 551 is associated with cache tag storage 550 so that attribute bits for each valid entry in level two cache 430 is available without needing to produce a physical address on physical address bus 431*a*.

Another aspect of this embodiment of the present invention is that there are two defined PAAM bits that need to be known at the time of a cache miss. Waiting for them to be returned with the data hurts performance. The two bits are the WA (write allocate) bit and the SS (synchronous store) bit. For these two bits only, remote PAAM 556 is implemented in level one data cache 420 and is connected to physical address bus 412*a* that is connected to provide addresses for requests to level two cache 430. Note that CPU core 401 has two 32-bit address buses provided by data unit D1 and D2. A cache miss in response to either address bus results in a request on physical address bus 412*b* and is monitored by remote PAAM 556. Since the reason for providing remote PAAM 556 is to deal with a cache miss, PAAM 556 is not directly associated with cache tag storage 555. Since the values are static for a given chip design, they are implemented in a small ROM as a direct mapped table. Care must be taken to assure that PAAM attribute bits in remote PAAM 556 agree with attribute bits in PAAM 480 for the same respective address ranges. In this embodiment, there is no hardware support for self-modifying code so that instructions stored in level one instruction cache 410 are not altered; therefore a remote PAAM is not needed in L1P 410.

However, in an alternative embodiment that supports self-modifying code, a remote PAAM in L1P would be advantageous, depending on configuration. For example, WA and SS are only needed when a store can originate from that cache. Self-Modifying Code normally proceeds with a data side write that snoops the program cache and related buffers invalidating or replacing the instructions that have been written. In that arrangement, the WA and SS bits are still needed on the data cache but not on the program cache.

In this embodiment, PAAM 480 is connected to physical address bus 431*a*. Cacheability attribute signals 482 are connected to provide cacheability information to L2 cache 430. Attribute signals 484 signals are connected to transfer request circuitry 541 to provide attribute information for physical memory 560 and devices 570 that are connected to extended DMA controller 440. In an alternative embodiment, there may be no connections of PAAM 480 to physical devices.

In an alternate embodiment, good modularity of design is provided by keeping a full copy of the PAAM info at each device. The processors need to cache or auto-configure information from the devices for the WA and SS bits to preserve this modularity.

Still referring to FIG. 5, a more detailed description of data transfers will now be given in order to explain a further aspect of PAAM 480. The level one instruction cache interface includes a 256-bit data path from level two unified cache 430 to level one instruction cache L1P 410. This data path size corresponds to one half of the 64 byte cache entry size within level one instruction cache 410 and equals one instruction fetch packet. In the preferred embodiment, the 256-bits are 64 bits from each of the four banks of level two unified cache 430. Thus level two unified cache 430 can source this amount of data in a single cycle. This occurs regardless of the amount of level two unified cache 430 configured as cache. Level two unified cache 430 may be configured to include variable amounts of static random access memory (SRAM) instead of cache memory. This aspect of the digital signal processor system is further detailed in co-assigned U.S. patent application Ser. No. 09/603,645 (TI-29343) entitled *Unified Memory System Architecture Including Cache And Addressable Static Random Access Memory* and is incorporated herein by reference. The cache/SRAM partitioning within level. two unified cache 430 is across the data banks rather than within the data banks. Thus level two unified cache 430 can always supply 256 bits to level one instruction cache 410 if any part is partitioned as cache. Level one instruction cache 410 may also receive data directly from data transfer bus 543, for example upon fetching code from non-cacheable memory addresses. Data transfer bus 543 supplies only 64 bits per cycle, thus at least four cycles are needed to accumulate the 256 bits. The data source for transfers to level one instruction cache 410 is selected by multiplexer 531. FIG. 5 illustrates supply of 32 address bits from level one instruction cache 410 to level two unified cache 430. Because level one instruction cache 410 operates on 256 bit boundaries, the 8 least significant bits are always zero and may be omitted from the address. Note that writes to level one instruction cache 410 are not permitted, therefore level one instruction cache 410 never supplies data to level two unified cache 430.

The level one data cache interface includes a 128-bit data path from level two unified cache 430 to level one data cache 420. In the preferred embodiment, the 128 bits are 64 bits from each of two banks of level two unified cache 430. This assumes no bank conflicts with other data transfers. Level two unified cache 430 only services one cache fill data transfer to level one data cache 420 per cycle. Thus if two load/store units in central processing unit 401 each request data and produce a read cache miss within level one data cache 420, the two read miss requests to level two unified cache 430 are serviced in sequence. As noted above, the cache/SRAM partitioning of level two unified cache 430 is across the memory banks. Thus level two unified cache 430 can supply data to level one data cache 420 from two banks so long as level two unified cache 430 is partitioned to include some cache. Level one data cache 420 may also receive data directly from data transfer bus 543, for example upon fetching data from non-cacheable memory addresses. Data transfer bus 543 supplies only 64 bits per cycle, however accesses to non-cacheable memory addresses are at most 64 bits. In this case, the 64 bits are transferred in a single data transfer cycle. The data source for transfers to level one data cache 420 is selected by multiplexer 433. FIG. 5 illustrates supply of two sets of 32 address bits via address bus 422a and address bus 423a from level one data cache 420 to level two unified cache 430. Because level one data cache 420 operates on 64 bit boundaries, the 6 least significant bits are always zero and may be. omitted from the address.

Level one data cache 420 may supply data to level two unified cache 430. This occurs on a write miss, a cache entry eviction and a response to a snoop hit to data in the modified state within level one data cache 420. It is possible that each of the load/store units within central processing unit 110 would require data transfer from level one data cache 420 to level two unified cache 430 in the same cycle. Upon a write miss within level one data cache 420, only the 32 bits of the write data is supplied from level one data cache 420 to L2 unified cache 430. For either a cache eviction or a snoop data response, level one data cache 420 supplies 128 bits to level two unified cache 430, the same data width as opposite transfers. Data from level one data cache 420 may also be supplied to data transfer bus 543 as selected by multiplexer 537. This could occur as a result of a write to a non-cacheable address.

The interface between level two unified cache 430 and data transfer bus 543 includes two 64-bit data busses 431*b* and 431*c*. Data bus 431*b* supplies data from data transfer bus 543 to level two unified cache 430. This data may be stored in level two unified cache 430 via a single 64-bit write port as selected by multiplexer 535. Data bus 431*c* is a 64-bit bus supplying data from level two unified cache 430 or level one data cache 420 as selected by multiplexer 537. All transfers using data transfer bus 543 employ direct memory access unit 150 responsive to commands via transfer request bus 541.

Physical address bus 431*a* comprises two physical address portions in order to allow parallel transfers on data buses 431*b* and 431*c*. In this embodiment of the present invention, PAAM 480 is dual ported such that both physical address portions that are present on physical address bus 431*a* can be monitored by PAAM 480.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

Figure 6:
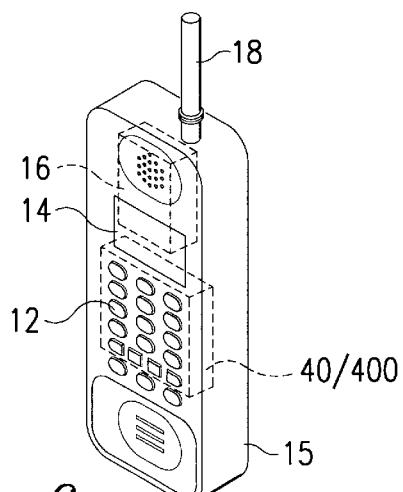
FIG. 6 illustrates a wireless telephone digital system that includes the DSP of FIG. 4.

FIG. 6 illustrates an exemplary implementation of an example of an integrated circuit 40 that includes digital system 400 in a mobile telecommunications device, such as a wireless telephone with integrated keyboard 12 and display 14. As shown in FIG. 6, digital system 400 with processor 401 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

Fabrication of digital system 400 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

An integrated circuit that includes any of the above embodiments includes a plurality of contacts for surface mounting. However, the integrated circuit could include other configurations, for example a plurality of pins on a lower surface of the circuit for mounting in a zero insertion force socket, or indeed any other suitable configuration.

Digital system 400 contains hardware extensions for advanced debugging features. These assist in the development of an application system. Since these capabilities are part of the core of CPU 401 itself, they are available utilizing only the JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

Thus, a digital system is provided with a physical address attribute map whether or not an address translation map is provided. Advantageously, signals to control certain cache memory modes are provided by the PAAM.

Advantageously, for devices present in the address space of the digital system that have different capabilities and characteristics, misuse is prevented by signaling an error or otherwise limiting the use of each device in response to attribute bits in the PAAM associated with the memory mapped address of the device.

Advantageously, capabilities'specified by PAAM entries are declarative rather than imperative, that is, the attribute bits declare the capabilities of the respective device rather than giving orders to the cache as to its behavior.

Advantageously, the PAAM does not require a memory management unit, or operating system control. Entries in the PAAM can be reliably set as a ROM at chip design time for many kinds of systems, including systems on a chip.

Advantageously, the PAAM is associated with cacheability, write-through, sharing, readability, writeability and I/O.

Advantageously, many programming errors can be detected and reported, such as access to address that has no device, for example.

Advantageously, the PAAM provides control of I/O memory ordering behavior to make programming of device access simpler.

Advantageously, when PS is used in combination with other information based on op code or on MMU status, very fine-grained control of sharing is possible. The performance and power cost of coherence can then be carefully controlled for use on just those memory operations that are truly to shared data.

As used herein, the terms. "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, a different number and sizes of caches may be implemented. Remote portions of the PAAM may be embodied within various peripheral devices. Different types of external memory resources may be provided. Different sizes and configurations of physical address and data busses may be provided. Multiprocessor systems may be configured in which requests from other DSPs are coordinated by transfer request circuitry 541 and data transfer bus 543.

It is therefore contemplated that the appended claims will cover any such modifications of the embodiments as fall within the true scope and spirit of the invention.

What is claimed is:

1. A digital system having a microprocessor, the microprocessor comprising:

a central processing unit (CPU) connected to an address generation unit;

a cache connected to the address generation unit via a first address bus, the cache having a plurality of operating modes;

memory circuitry connected to the cache via a data bus, wherein the memory circuitry is connected to receive an address from the address generation unit via a second address bus;

at least a first memory mapped device connected to the second address bus, wherein the first memory mapped device is mapped at a first address; and a physical address attribute memory (PAAM) connected to the second address bus, the PAAM being connected to the cache via at least a first attribute control signal, wherein the PAAM is operable to assert the first attribute control signal in response to the first address being on the second address bus, such that the cache operates in a first one of the plurality of operating modes when the first memory mapped device is addressed and in a different one of the plurality of operating modes when the memory circuitry is addressed.

2. The digital system of claim 1, further comprising a second attribute control signal connecting the PAAM to the memory circuit, wherein the PAAM is operable to assert the second attribute control signal in response to a second address being on the second address bus.

3. The digital system of claim 1, further comprising a memory management unit with address translation capabilities connected to the address generation unit and having an output to provide the first address bus.

4. The digital system of claim 3, wherein the first address bus and the second address bus are the same bus.

5. The digital system of claim 1, wherein the PAAM comprises:
   at least a first attribute storage circuit for providing the first attribute control signal; and
   at least a first pair of comparators each connected to receive the second address bus, the first pair of comparators operable to enable the first attribute storage circuit only when a proffered address on the second address bus has a value between a low limit and a high limit.

6. The digital system of claim 5, wherein the PAAM further comprises a plurality of attribute storage circuits and a plurality of pairs of comparators, wherein each of the plurality of attribute storage circuits is connected for enabling to just one of the pairs of comparators.

7. The digital system according to claim 5 being a cellular telephone, further comprising:
   an integrated keyboard connected to the processor via a keyboard adapter;
   a display, connected to the processor via a display adapter;
   radio frequency (RF) circuitry connected to the processor; and
   an aerial connected to the RF circuitry.

8. The digital system of claim 1, wherein the PAAM comprises a direct mapped multi-word storage circuit, wherein the storage circuit is connected to receive a set of most significant bits of the second address bus, such that the PAAM is operable to provide the first attribute control signal in response to the set of most significant address bits.

9. The digital system of claim 1, wherein the first attribute control signal indicates shared memory, and wherein the cache is operable to maintain data coherence; and
   wherein the cache is responsive to the first attribute signal to not maintain coherence for a data item accessed when the first attribute control signal indicates the data item is not shared in response to an address of the data item on the second address bus, whereby power consumption is reduced.

10. A method for operating a digital system having a microprocessor with cache memory and a memory subsystem, comprising the steps of:
    identifying a plurality of regions within an address space associated with the memory subsystem;
    detecting which of the plurality of regions is being accessed by monitoring an address of each memory request to the memory subsystem;
    for each memory request, determining if an accessed region is a shared region by examining an attribute bit associated with the address region; and
    for each memory request, operating the cache in a coherent manner if the accessed region is shared otherwise, operating the cache without regard to coherence.

11. The method of claim 10, wherein the step of identifying comprises identifying one or more regions having a size that is smaller than another region.

12. A digital system having a microprocessor, the microprocessor comprising:
    a central processing unit (CPU) connected to an address generation unit;
    a cache connected to the address generation unit via an address bus,
    memory circuitry connected to the cache via a data bus, wherein the memory circuitry is connected to respond to addresses from the address generation unit, and
    a physical address attribute memory (PAAM) connected to the address bus, the PAAM being connected to the cache via at least a first attribute control signal line, wherein the PAAM is operable to assert the first attribute control signal in response to an address being in a particular address region, wherein the first attribute control signal indicates a shared memory region; and
    wherein the cache is responsive to the first attribute signal to maintain coherence for a data item accessed from a shared region of the memory and to not maintain coherence for a data item accessed from a non-shared region of the memory.

13. The digital system of claim 12, further comprising a second attribute control signal line connecting the PAAM to an interface of the memory circuitry, wherein the PAAM is operable to assert the second attribute control signal in response to an address being in a particular address region, and wherein the interface of the memory circuitry is operable to be configured in response to the second attribute control signal.

14. The digital system of claim 12, wherein the PAAM comprises:
    at least a first attribute storage circuit for providing the first attribute control signal; and
    at least a first pair of comparators each connected to receive the address bus, the first pair of comparators operable to enable the first attribute storage circuit only when a proffered address on the address bus has a value between a low limit and a high limit.

15. The digital system of claim 12, wherein the PAAM comprises a direct mapped multi-word storage circuit, wherein the storage circuit is connected to receive a set of most significant bits of the second address bus, such that the PAAM is operable to provide the first attribute control signal in response to the set of most significant address bits.

* * * * *